(12) United States Patent
Krishnamoorthy et al.

(10) Patent No.: US 6,782,037 B1
(45) Date of Patent: Aug. 24, 2004

(54) DEMODULATION METHOD FOR RECEIVER

(75) Inventors: Rajeev Krishnamoorthy, Middletown, NJ (US); Xiaodong Li, Piscataway, NJ (US); Shankar Narayanaswamy, Sunnyvale, CA (US); Markus Rupp, Lincroft, NJ (US); Harish Viswanathan, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/361,317

(22) Filed: Jul. 27, 1999

(51) Int. Cl.[7] .............................................. H04B 1/69
(52) U.S. Cl. ...................................................... 375/138
(58) Field of Search ................................ 375/138, 139, 375/130, 150; 370/342, 335, 350, 468, 437

(56) References Cited

U.S. PATENT DOCUMENTS

| | | | |
|---|---|---|---|
| 5,289,476 A | | 2/1994 | Johnson et al. ............ 371/37.1 |
| 5,930,243 A | * | 7/1999 | Parish et al. ................ 370/334 |
| 6,028,901 A | * | 2/2000 | Huynh et al. ............... 375/229 |
| 6,400,928 B1 | * | 6/2002 | Khullar et al. ........... 455/67.11 |
| 6,452,913 B1 | * | 9/2002 | Proctor, Jr. ................. 370/335 |
| 6,473,506 B1 | * | 10/2002 | Hook et al. ................. 379/279 |
| 6,490,270 B1 | * | 12/2002 | Krishnamoorthy et al. . 370/347 |

OTHER PUBLICATIONS

European Search Report No. 00306079.5–2216, Nov. 28, 2000—European Patent Office—The Hague.
Otsuki, S. et al., "Performance of Modulation–Level–Controlled Adaptive Modulation Systems", Electronics and Communications in Japan, Part 1, vol. 79, No. 7, pp. 81–93; 1996.
Hamaguchi, K. et al., "Implementation and Performance of Qam–Level–Controlled Adaptive Modulation For Land Mobile Communications", Electronics Letters, vol. 33, No. 18; Aug. 28, 1997.

* cited by examiner

*Primary Examiner*—Khai Tran
(74) *Attorney, Agent, or Firm*—Eugene J. Rosenthal

(57) ABSTRACT

In a wireless communication system, the constellation mapping scheme employed may be changed on a per-time-slot basis, i.e., from time slot to time slot, so that the constellation used to encode the symbols of each time slot may be different for each time slot within a single frame and may be different for a particular time slot in different consecutive frames. In other words, several constellation mapping schemes are available, with each providing the ability to transmit a different number of bits per symbol, and the particular constellation mapping scheme employed for any time slot need be selected for that time slot only. The ability to use any particular constellation mapping scheme is dependent on the current channel quality. The particular constellation mapping used for the user data of the time slot may be indicated in the preamble of the time slot. To this end, each time slot may have its own preamble that is mapped with a constellation mapping scheme which is a) known à priori, b) may be the same for all time slots, and c) may be different from the constellation mapping scheme used to encode user data in the time slot. A receiver can determine the constellation mapping used for each time slot from solely from the preamble of the time slot.

10 Claims, 3 Drawing Sheets

DEMODULATION METHOD FOR RECEIVER

TECHNICAL FIELD

This invention relates to the art of allocating available data rate to users of a wireless communication system, and in particular, to allocating available data rate to users of fixed wireless loop, or so-called "wireless local loop" systems.

BACKGROUND OF THE INVENTION

Typical prior art wireless systems employ a fixed data rate allocation per user. Once a user is assigned a modulation scheme, i.e., a constellation for mapping the user's bits into symbols, the user's data rate is fixed unless the user is assigned further, e.g., an additional one or more, time slots. Such systems are unable to take advantage of improvements in channel quality, and suffer in the event of channel quality degradation.

SUMMARY OF THE INVENTION

In accordance with the principles of the invention, the constellation mapping scheme employed may be changed on a per-time-slot basis, i.e., from time slot to time slot, so that the constellation used to encode the symbols of each time slot may be different for each time slot within a single frame and may be different for a particular time slot in different consecutive frames. In other words, several constellation mapping schemes are available, with each providing the ability to transmit a different number of bits per symbol, and the particular constellation mapping scheme employed for any time slot need be selected for that time slot only. The ability to use any particular constellation mapping scheme is dependent on the current channel quality.

In accordance with an aspect of the invention, the particular constellation mapping used for the user data of the time slot may be indicated in the preamble of the time slot. To this end, each time slot may have its own preamble that is mapped with a constellation mapping scheme which is a) known a priori, b) may be the same for all time slots, and c) may be different from the constellation mapping scheme used to encode user data in the time slot.

In accordance with another aspect of the invention, a receiver can determine the constellation mapping used for each time slot from the preamble of the time slot.

Advantageously, by having the ability to change the constellation mapping scheme employed on a per-time-slot basis the user's data rate may be rapidly changed, i.e., increased or decreased, to correspond to the data rate that has the highest throughput under current channel conditions and the user's specified QoS. Since the constellation mapping scheme that may be employed is a function of the channel quality, which may change over time, it is necessary to monitor the channel quality to determine which constellation mapping is appropriate to use for each time slot.

DETAILED DESCRIPTION

Figure 1:
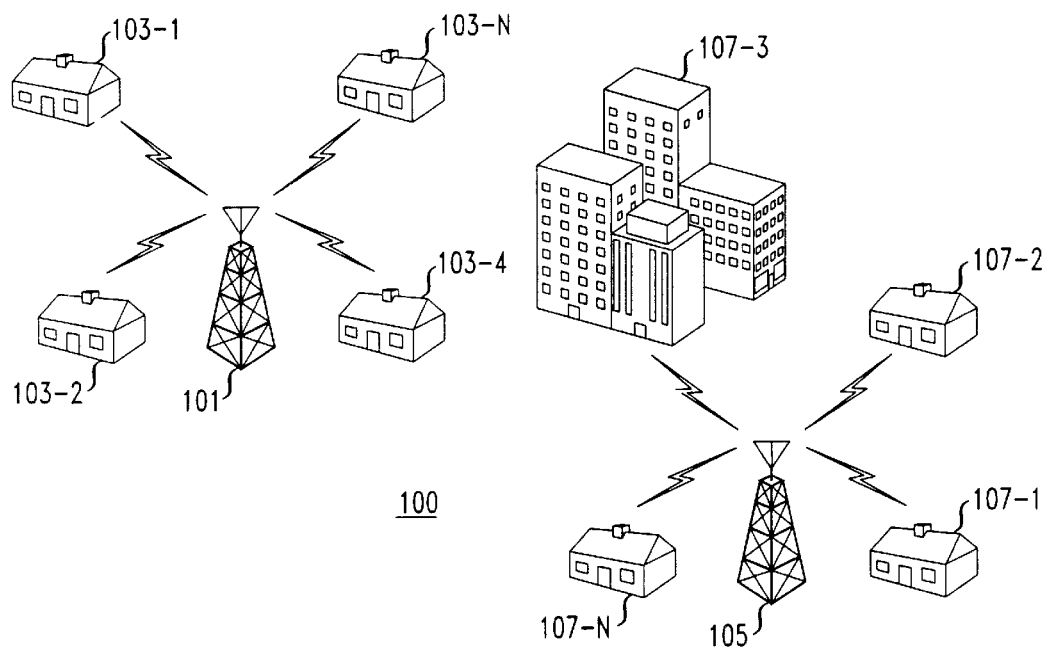
FIG. 1 shows exemplary steerable beam TDMA wireless communication system arranged in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Note that as used herein channel quality includes effects from channel properties, such as multipath; interference from other sources, such as other radio sources of the same or other systems as well as cosmic sources; and noise, such as thermal noise within the receiver itself.

Note that a "user" as referred to herein may be reflective of a particular person, a particular terminal, or particular applications or instantiations thereof, depending on the implementor. Those of ordinary skill in the art will readily be able to design from the description herein systems that accommodate any of these meanings for the "user", and even for any combination of such meanings.

FIG. 1 shows exemplary steerable beam TDMA wireless communication system 100 arranged in accordance with the principles of the invention. Wireless communication system 100 includes base station antenna 101 serving remote terminals 103-1 through 103-N, collectively remote terminals 103, and base station antenna 105 serving remote terminals 107-1 through 107-N, collectively remote terminals 107. The pairing of a remote terminal with a particular base station is determined by the implementor based on the best signal power and least interference that can be achieved for a remote terminal-base station pair.

In steerable beam wireless communication system 100, the beam pattern formed at the remote terminal location may be of any arbitrary width. The particular width of the beam is a function of the directionality of the antenna design and often it is a wide beam. Typically the same beam pattern is used for both transmitting and receiving. For example, an antenna at the remote terminal location having a 30° angle has been employed in one embodiment of the invention, although any other angle may be used.

The base station has the ability to controllably form beam patterns of substantially arbitrary width, so as to listen and transmit on either a wide beam or on a narrow beam, depending on the situation. Initially, e.g., during call setup, communication between a base station and a remote terminal is carried out by having the base station use a wide beam. However, once a communication channel is established between a base station and a remote terminal, i.e., a so-called "traffic" channel, the base station typically uses a narrow beam. When using a narrow beam, the base station directs the beam in the direction of the remote terminal at the time communication is to take place between the base station and the remote terminal. Communication may be simultaneously bidirectional between the base station and the remote terminal, e.g., one frequency is used for transmission from the base station to the remote terminal while a second frequency is used for transmission from the remote terminal to the base station.

Figure 2:
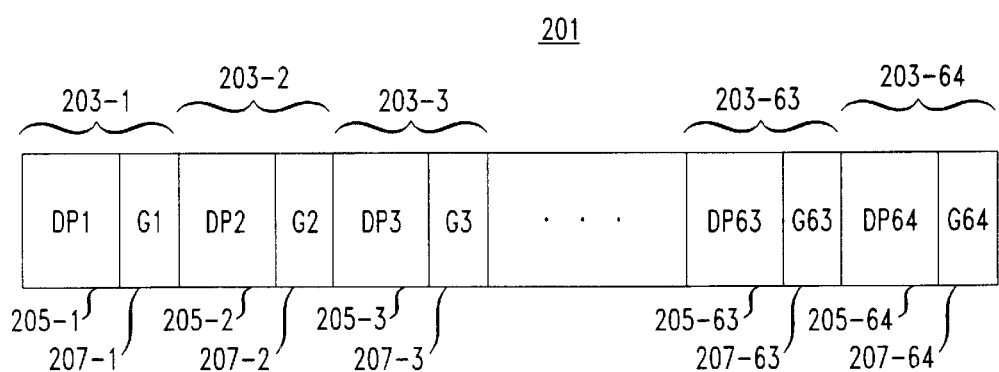
FIG. 2 shows an exemplary frame structure for use in the steerable beam wireless communication system shown in FIG. 1.

Steerable beam wireless communication system 100 of FIG. 1 is a time division multiple access (TDMA) system. Such systems employ a repeating frame structure, within each frame there being time slots. FIG. 2 shows an exemplary frame structure 201 for use in steerable beam wireless communication system 100. Frame structure 201 is 2.5 ms long and contains within it 64 time slots 203, including time slots 203-1 through 203-64. Each of time slots 203 includes a data part (DP) 205 and a guard interval (G) part 207. For example, each of time slots 203 is 2.5/64 ms, which is 39.0625 $\mu$s. Each guard interval 207 is 2 $\mu$s leaving each data part 205 as being 37.0625 $\mu$s. The same frame structure is used for both the uplink, i.e., from the remote terminal to the base station, and for the downlink, i.e., from the base station to the remote terminal.

More specifically, each time slot 203 is divided into symbols, the number of which is determined by the implementor based on bandwidth and the time slot period. For example, as noted above, a 39.0625 $\mu$s time slot period with a guard interval of 2 $\mu$s leaves a data part of 37.0625 $\mu$s. If the channel bandwidth is 5 MHz, and the useful bandwidth 3.9936 MHz, then there are 148 symbols, each of length approximately 250.04 ns.

The number of bits per symbol, i.e., the constellation size, determines the number of bits that are transmitted in each time slot. In accordance with an aspect of the invention, the number of bits per symbol may be changed on a per-time slot basis regardless of the position of the data that is to be placed in time slot within the data stream of the user, i.e., regardless of the state of the segmentation algorithm which is dividing the user data into radio link packets for transmission in time slot-sized units. For example, in one embodiment of the invention, five different modulation schemes are employed, namely, a) quadrature phase shift keying (QPSK), b) 8-ary phase shift keying (8-PSK), c) 16 quadrature amplitude modulation (16-QAM), d) 32 quadrature amplitude modulation (32-QAM), d) 64 quadrature amplitude modulation (64-QAM). For a time slot with 148 symbols, these modulation schemes enable the transmission therein of a) 296, b) 444, c) 592, d) 740, and e) 888 raw bits, respectively. Note that the actual bits available for user data in a time slot will often be less than the number of raw bits due to the use of raw bits for training sequences, headers, error detection and/or correction codes, and the like.

In accordance with an aspect of the invention, the constellation mapping scheme employed may be changed on a per time slot basis. Advantageously, by changing the constellation mapping scheme employed per-time-slot and the number of time slots employed by a user the user's data rate may be rapidly changed, i.e., increased or decreased.

Although simply changing the modulation scheme employed is easy, doing so in a manner that a receiver can respond appropriately to such a change is not. Therefore, in accordance with the principles of the invention, one or more specific training sequences are incorporated into the preamble of each time slot for use in both identifying the type of modulation used for the remainder of the time slot and for use in performing conventional training functions such as timing recovery, carrier recovery, and channel equalization, in a high quality fashion. In accordance with an aspect of the invention, correlation is used in the receiver to identify which particular training sequence has been received.

In one embodiment of the invention, the training sequences are all modulated using a binary phase shift keying (BPSK) modulation scheme, essentially one of simplest known modulation schemes. Such a simple scheme is employed so as to maximize the likelihood of the information being properly received. Furthermore, because the length of the training sequence to get good performance varies as a function of the modulation scheme employed, an initial determination is performed using a first number of symbols, e.g., 13, as to whether the modulation scheme employed is QPSK or one of the other modulation schemes.

If QPSK is detected then no more symbols need be employed than those used for the initial determination, and so those symbols remain available to carry additional payload in QPSK modulated time slots. This is beneficial because QPSK has the lowest throughput of the modulation schemes listed above that are employed in this exemplary embodiment. Also, by having an initial separation into QPSK and other modulation schemes the correlation results are more likely to be accurate than if there was a need to detect each modulation scheme separately initially.

If QPSK is detected by the correlator in the receiver, the remainder of the time slot is demodulated using QPSK demodulation. Furthermore, once the particular training sequence for QPSK is recognized, the samples that make up the training sequence can be used for conventional training, as the value of the training sequence is now known.

If QPSK is not detected by the correlator in the receiver, then clearly the modulation scheme employed is one of the other modulation schemes. Furthermore, the training sequence is recognized as being that sequence of symbols that indicates that a modulation scheme other than QPSK is being employed. Once this particular training sequence is recognized, the samples that make up this "other" training sequence can be used for conventional training, as the value of the training sequence is now known. However, preferably, training is deferred until a second training sequence, that is transmitted within the same timeslot but after the first training sequence and that identifies which particular modulation scheme other than QPSK is being employed, is determined. To this end, once the "other" training sequence is recognized the symbols at a second location within the time slot that make up a second training sequence are compared using correlation to one or more of a set of respective training sequences, each member of the set respectively identifying the modulation scheme of the time slot as being one of 8-PSK, 16-QAM, 32-QAM, or 64-QAM. The modulation scheme corresponding to the one of the known training sequences that correlates most highly with the symbols at a second location within the time slot at which the second training sequence are to be found is determined to be the modulation scheme employed for use in demodulating the remainder of the time slot. Furthermore, once the particular training sequence is recognized, the samples that make up the training sequence and the samples that make up the original "other" training sequence can be used for conventional training, as the value of the entire training sequence is now known.

Figure 3:
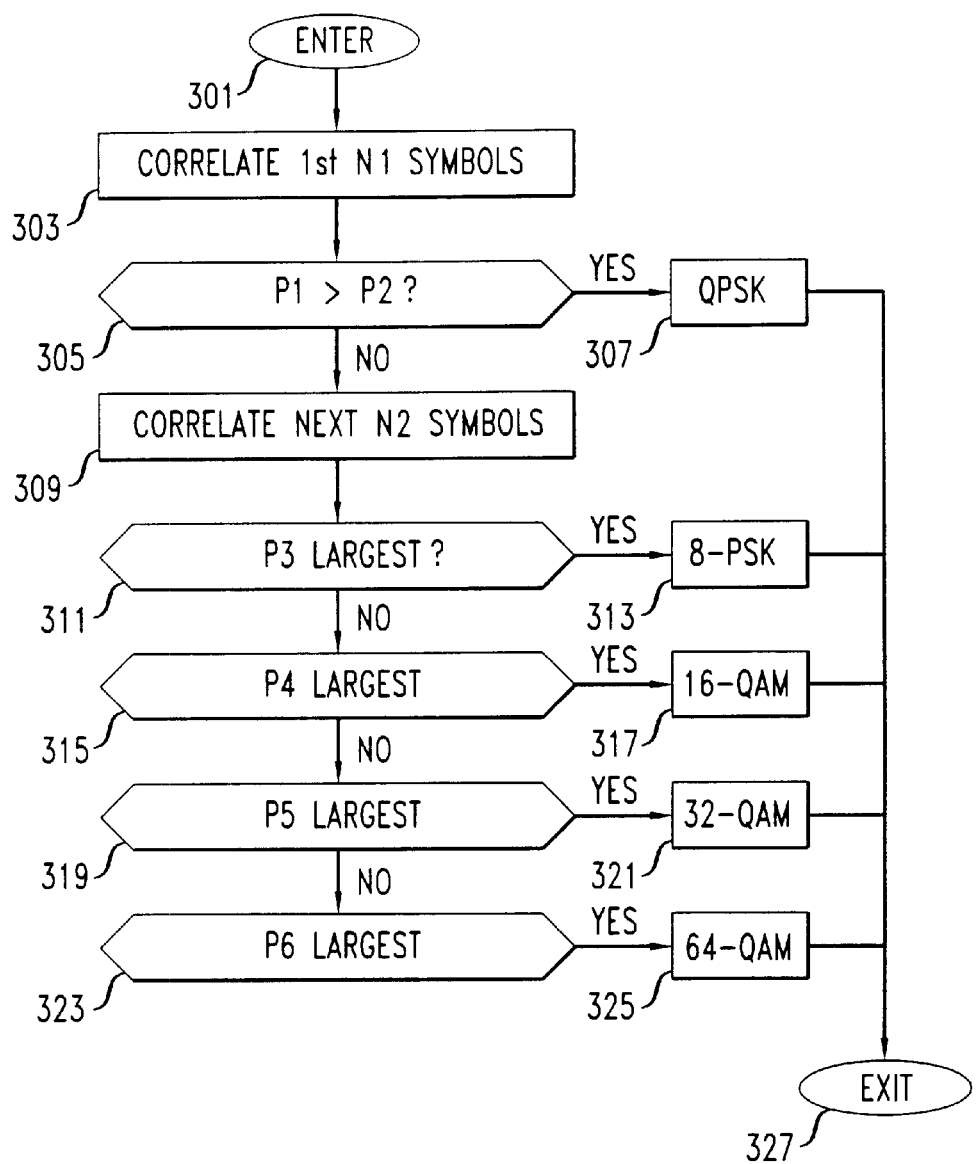
FIG. 3 shows an exemplary process, in flow chart form, for determining the modulation scheme used to modulate the payload portion of a time slot and identifying a received training sequence.

FIG. 3 shows an exemplary process, in flow chart form, for determining in a receiver the modulation scheme that had been used to modulate the payload portion of a time slot. The process is entered in step 301 when a new time slot is received via the air interface. Next, in step 303, the first N1 symbols, which are in the positions at which the training sequence is expected, are correlated with two possible training sequences, P1 and P2. For example, P1 and P2 may each be 13 symbols and P1 indicates that the time slot payload is QPSK modulated while P2 indicates that some modulation scheme other than QPSK is employed for the time slot payload. Conditional branch point 305 tests to determine if the result of the correlations performed in step 303 is such that the output corresponding to P1 is greater than the output corresponding to P2. If the test result in step 305 is YES, indicating that the received training sequence is that for QPSK, control passes to step 307, and the packet is processed as if it is modulated using QPSK. To this end, the training is performed using the QPSK training sequence and data demodulation is performed for QPSK data. The process then exits in step 327.

If the test result in step 307 is NO, indicating the time slot is not QPSK modulated, control passes to step 309 in which the next N2 symbols, which are to correspond to the second training sequence, are correlated as a sequence against training sequences P3, P4, P5 and P6 that correspond to 8-PSK, 16-QAM, 32-QAM, or 64-QAM, respectively. Conditional branch point 311 tests to determine if the output of the correlator that correlated the N2 symbols with P3 has produced the largest output. If the test result in step 311 is YES, control passes to step 313 and the packet is processed as if it is modulated using 8-PSK. To this end, the training is performed using the N1 symbols corresponding to P2 in combination with the 8-PSK training sequence P3, and data demodulation is performed for 8-PSK data. The process then exits in step 327.

If the test result in step 311 is NO, control passes to conditional branch point 315, which tests to determine if the output of the correlator that correlated the N2 symbols with P4 has produced the largest output. If the test result in step 315 is YES, control passes to step 317, and the packet is processed as if it is modulated using 16-QAM. To this end, the training is performed using the N1 symbols corresponding to P2 in combination with the 16-QAM training sequence P4, and data demodulation is performed for 16-QAM data. The process then exits in step 327.

If the test result in step 315 is NO, control passes to conditional branch point 319, which tests to determine if the output of the correlator that correlated the N2 symbols with P5 has produced the largest output. If the test result in step 319 is YES, control passes to step 321, and the packet is processed as if it is modulated using 32-QAM. To this end, the training is performed using the N1 symbols corresponding to P2 in combination with the 32-QAM training sequence P5, and data demodulation is performed for 32-QAM data. The process then exits in step 327.

If the test result in step 319 is NO, control passes to conditional branch point 323, which tests to determine if the output of the correlator that correlated the N2 symbols with P6 has produced the largest output. If the test result in step 323 is YES, control passes to step 325, and the packet is processed as if it is modulated using 64-QAM. To this end, the training is performed using the N1 symbols corresponding to P2 in combination with the 64-QAM training sequence P6, and data demodulation is performed for 64-QAM data. The process then exits in step 327.

In accordance with an aspect of the invention, when performing the correlation in step 309 it is further advantageous to also recorrelate the first N1 symbols with P2 and to take the combined result of the correlations of the first N1 symbols and the next N2 symbols with each respective one of P3, P4, P5, and P6 as a unit for using in steps 311, 315, 319 and 323.

In one embodiment of the invention, the correlation called for herein is performed only after downconversion to baseband has been completed for both the in-phase (I) and quadrature (Q) signals which are carried on the radio link. The I and Q baseband signals are converted to the digital domain, with a new digital value being generated for each symbol period for each of I and Q.

Correlation is then performed between the indicated number of symbols of I and Q and the codeword being tested for, e.g., P1, P2, P3, etc., e.g., using a codeword correlator. Each correlation output is then squared and the sum of the squares is then added. The resulting sum is then used in steps calling for the result of a correlation.

Figure 4:
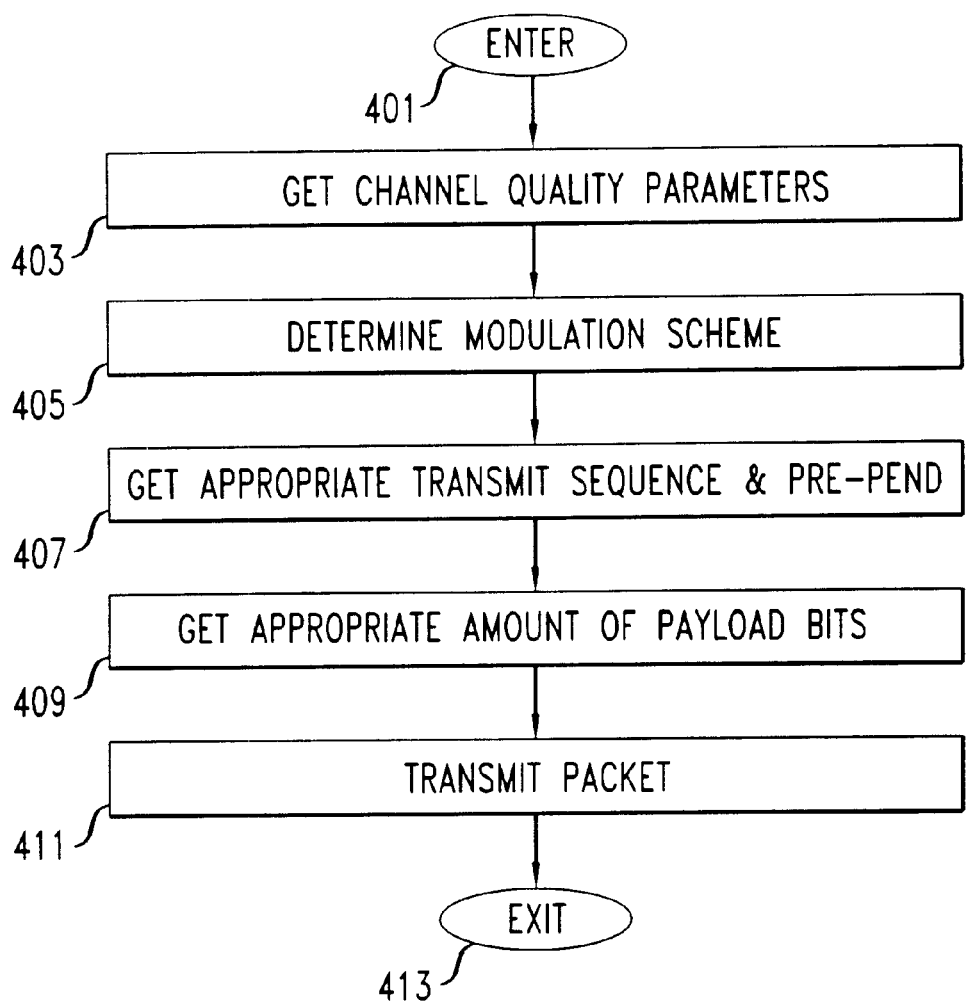
FIG. 4 shows, in flow chart form, an exemplary process employed by a transmitter to transmit data when various modulation schemes are available for modulating the data on a per-time slot basis.

FIG. 4 shows, in flow chart form, an exemplary process employed by a transmitter to transmit data when various modulation schemes are available for modulating the data on a per-time slot basis. The process is entered in step 401, when it is time to prepare data for transmission in an upcoming time slot. Next, in step 403, the channel quality parameters are obtained, from which it is determined, in step 405, the modulation scheme that will be employed to modulate this time slot. The particular mapping of channel quality to modulation scheme is at the discretion of the implementor, as it is a function of the system requirements. Those of ordinary skill in the art will be able to develop such mappings.

Thereafter, in step 407, the appropriate training sequence that corresponds to the selected modulation scheme is placed in the preamble of the time slot. The amount of data that can fit within a time slot when modulated with the selected modulation scheme is obtained in step 409 and so modulated in step 411. The time slot is then transmitted in step 413 and the process exits in step 415.

Those of ordinary skill in the art will recognize that it is not necessary to change modulation scheme on a per-time-slot basis, although it may be preferable to do so. Instead, the modulation scheme may be changed at known intervals, and the necessary analysis performed only when a modulation scheme change is permitted.

Note that as used herein, within the rubric of the term "frame structure" is included the idea that is sometimes referred to as a superframe, i.e., the frame is defined as being bounded by a known regularly repeating time slot, although other smaller frames may be included therein. Furthermore, the term preamble should not be viewed as limiting the identification of the selected modulation scheme to come before the user data in a time slot, as is most common, but may also include situations in which the identification of the selected modulation scheme comes after the user data in a time slot.

What is claimed is:

1. A method for determining a modulation scheme used in mapping of a user's data on a per-time-slot basis, the method comprising the steps of:
   performing at least one correlation of a portion of said time slot and at least two known training sequences that are each indicative of a particular one of a plurality of modulations schemes that are permitted to have been employed to modulate said user's data; and
   selecting a modulation scheme that corresponds to the at least one known training sequence that produces the best correlation result in said performing step.

2. A method for use in a receiver that is adapted to receive a transmission modulated using, on a per-time-slot basis one of a plurality of multiple constellation mapping schemes, each said time slot having a preamble, said method comprising the steps of:
   correlating N1 symbols, which are in positions in said preamble at which a training sequence is expected, with each of a plurality of first known training sequences;
   using a constellation mapping scheme that corresponds to a first one of said first plurality of known training sequences when a first one of said plurality of known training sequences is most highly correlated with said first N1 symbols;
   correlating N2 symbols of said preamble with each of a plurality of known second training sequences, each of said second training sequences corresponding to a respective one of said constellation mapping schemes other than the one of said constellation mapping schemes corresponding to said first one of said plurality of known training sequence;
   using the constellation mapping scheme that corresponds to a one of said second plurality of known training sequences that is the most highly correlated with said N2 symbols when said first one of said plurality of known training sequences is not most highly correlated with said first N1 symbols and
   performing training of said receiver using said at least N1 symbols when said first one of said plurality of known training sequences is the most highly correlated with said first N1 symbols and using at least said at least N2 symbols when said first one of said plurality of known training sequences is not the most highly correlated with said first N1 symbols.

3. The invention as defined in claim 2 further wherein said N2 symbols are distinct from said N1 symbols.

4. The invention as defined in claim 2 wherein the step of performing training of said receiver uses at least said N1 and said at least N2 symbols when said first one of said plurality of known training sequences is not the most highly correlated with said first N1 symbols.

5. Apparatus for use in a receiver that receives a transmission modulated using, on a per-time-slot basis one of a plurality of multiple constellation mapping schemes, each said time slot having a preamble, said apparatus:
   means for correlating N1 symbols, which are in positions in said preamble at which a training sequence is expected, with each of a plurality of first known training sequences;
   means for using a constellation mapping scheme that corresponds to a first one of said first plurality of known training sequences when a first one of said plurality of known training sequences is most highly correlated with said first N1 symbols;
   means for correlating N2 symbols of said preamble with each of a plurality of known second training sequences, each of said second training sequences corresponding to a respective one of said constellation mapping schemes other than the one of said constellation mapping schemes corresponding to said first one of said plurality of known training sequence;
   means for using the constellation mapping scheme that corresponds to a one of said second plurality of known training sequences that is the most highly correlated with said N2 symbols when said first one of said plurality of known training sequences is not most highly correlated with said first N1 symbols; and
   means for performing training of said receiver using said at least N1 symbols when said first one of said plurality of known training sequences is the most highly correlated with said first N1 symbols and using at least said at least N2 symbols when said first one of said plurality of known training sequences is not the most highly correlated with said first N1 symbols.

6. The apparatus as defined in claim 5 further wherein said N2 symbols are distinct from said N1 symbols.

7. The apparatus as defined in claim 5 further including means for using at least said N1 along with said at least N2 symbols when said first one of said plurality of known training sequences is not the most highly correlated with said first N1 symbols.

8. A method for use in a receiver comprising the step of
   receiving a transmission that is modulated using, on a per-time-slot basis, one of a plurality of multiple constellation mapping schemes, each said time slot having a preamble;
   said method being further CHARACTERIZED by the steps of correlating a first portion a preamble of a particular time slot with each of a first plurality of known training sequences;

using a constellation mapping scheme that corresponds to a first one of said first plurality of known training sequences when said first one of said first plurality of known training sequences is the most highly correlated with said portion of said preamble as the particular one of said plurality of multiple constellation mapping schemes is being used for said particular time slot;

training said receiver at least as a function of said first one of said first plurality of known training sequences, when said first one of said first plurality of known training sequence is the most highly correlated with said portion of said preamble as the result of said determining step;

correlating, when said first one of said first plurality of known training sequences is not the most highly correlated with said first portion of said preamble, a second portion of said preamble with each of a plurality of second known second training sequences, each of said second known training sequences corresponding to a respective one of said constellation mapping schemes other than the one of said constellation mapping schemes corresponding to said first one of said first plurality of known training sequences;

using, when said first one of said first plurality of known training sequence is not the most highly correlated with said first portion of said preamble, a constellation mapping scheme that corresponds to a one of said second plurality of known training sequences that is the most highly correlated with said second portion of said preamble; and training said receiver at least as a function of said one of said second plurality of known training sequences that is the most highly correlated with said second portion of said preamble when said first one of said first plurality of known training sequence is not the most highly correlated with said first portion of said preamble.

9. The method as defined in claim 8 being further CHARACTERIZED in that said training in said step of training said receiver at least as a function of said one of said second plurality of known training sequences that is the most highly correlated with said second portion of said preamble is performed such that it is also at least a function a training sequence of said first plurality of known training sequences other than said first one of said first plurality of known training sequences when said first one of said first plurality of known training sequence is not the most highly correlated with said first portion of said preamble.

10. Software in a computer readable form for determining a modulation scheme used in mapping of a user's data on a per-time-slot basis, the software being CHARACTERIZED by:

a module for performing at least one correlation of a portion of said time slot and at least two known training sequences that are each indicative of a particular one of a plurality of modulations schemes that are permitted to have been employed to modulate said user's data; and a module for selecting a modulation scheme that corresponds to the at least one known training sequence that produces the best correlation result by said means for performing.

\* \* \* \* \*